Oct. 31, 1961 W. KOPP ET AL 3,006,261
FILM COUNTER FOR MAGAZINE CAMERA
Filed May 1, 1957 6 Sheets-Sheet 5

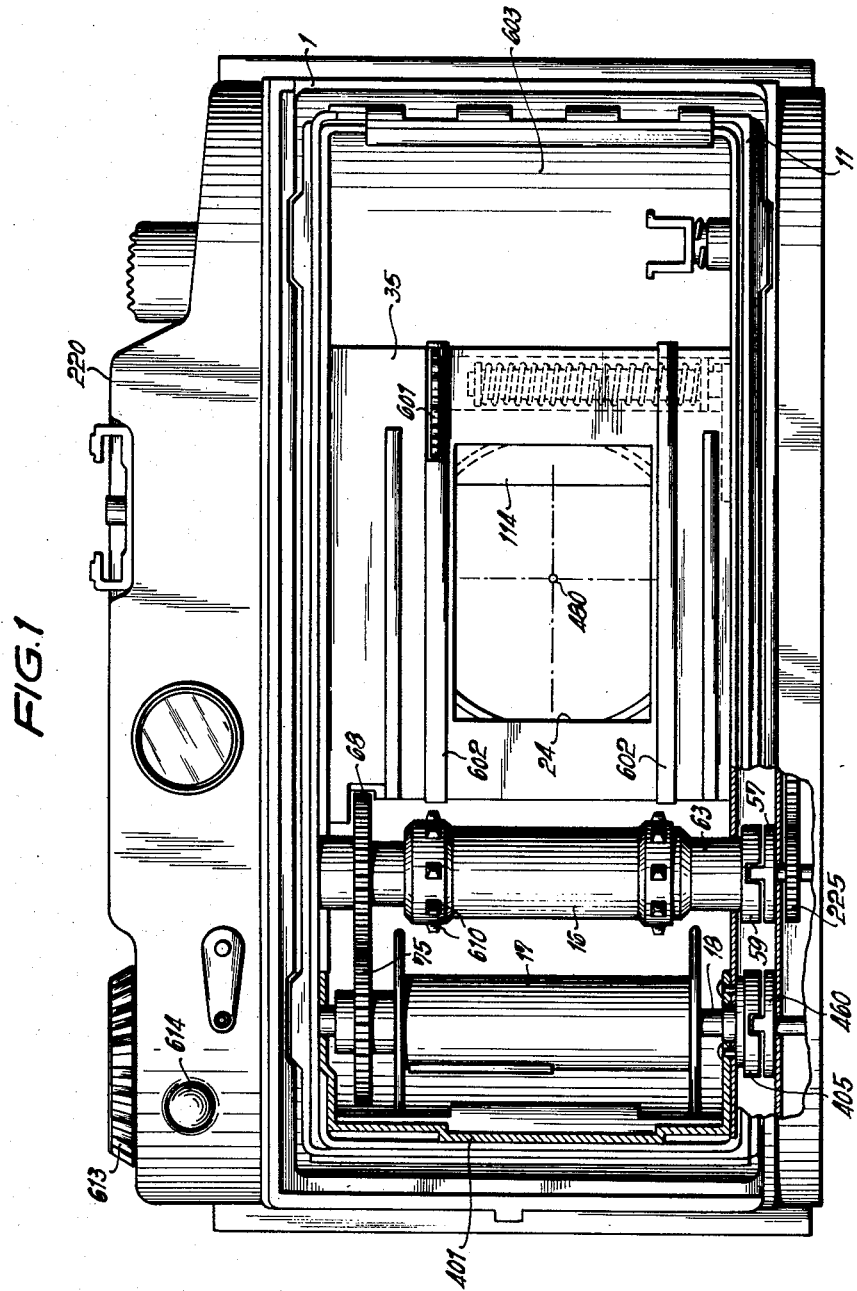

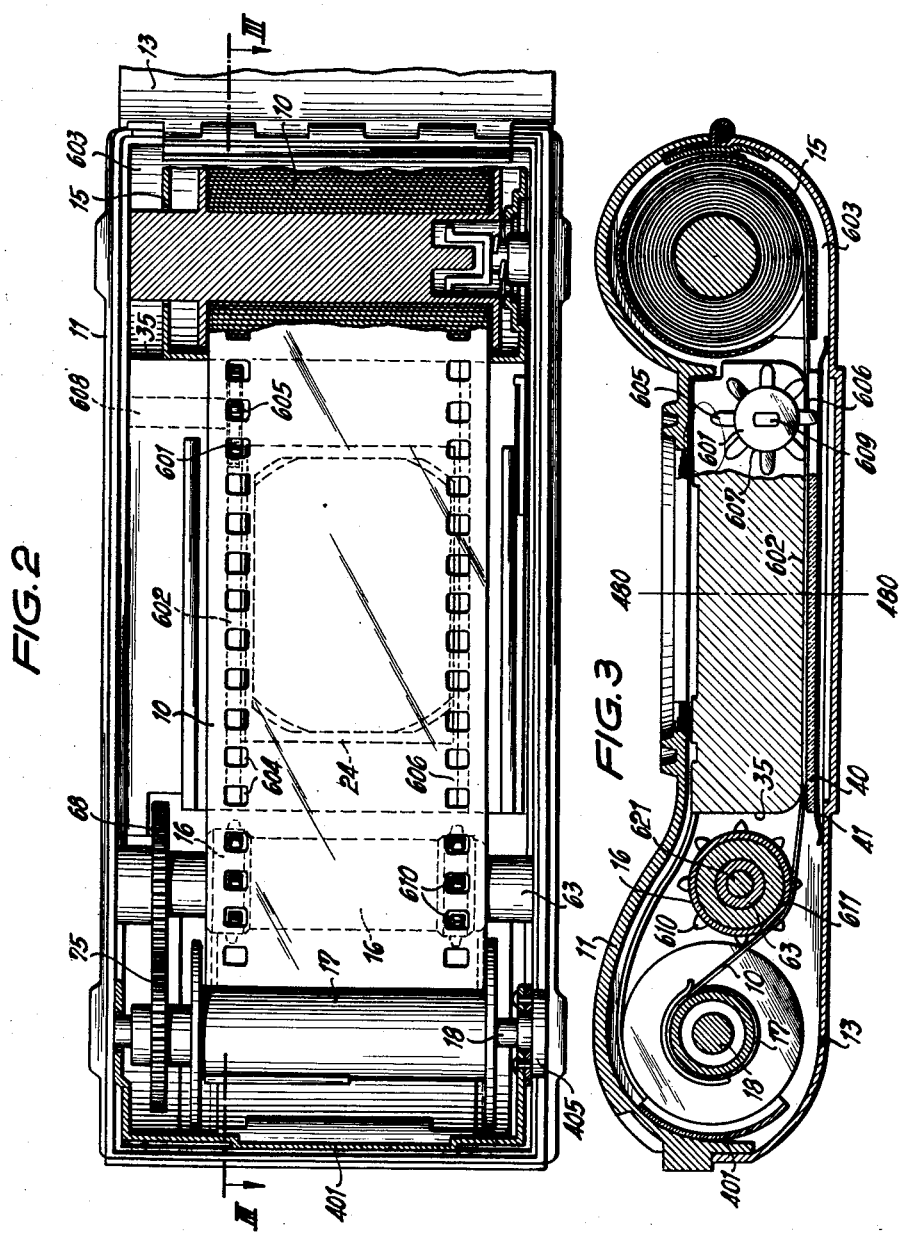

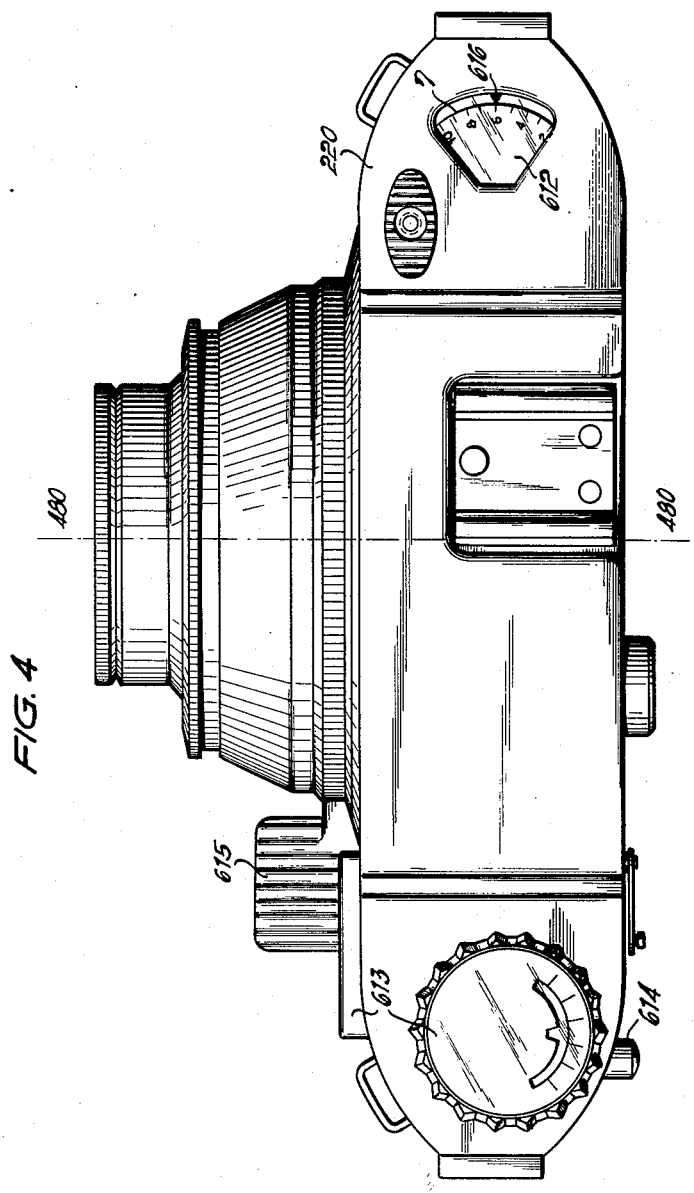

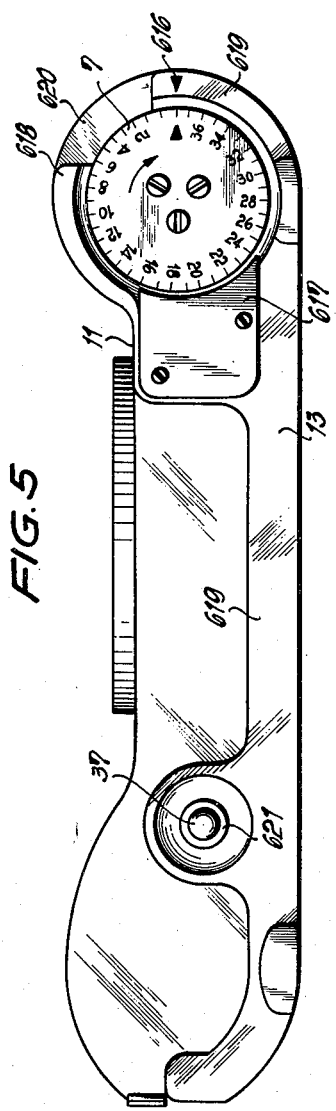
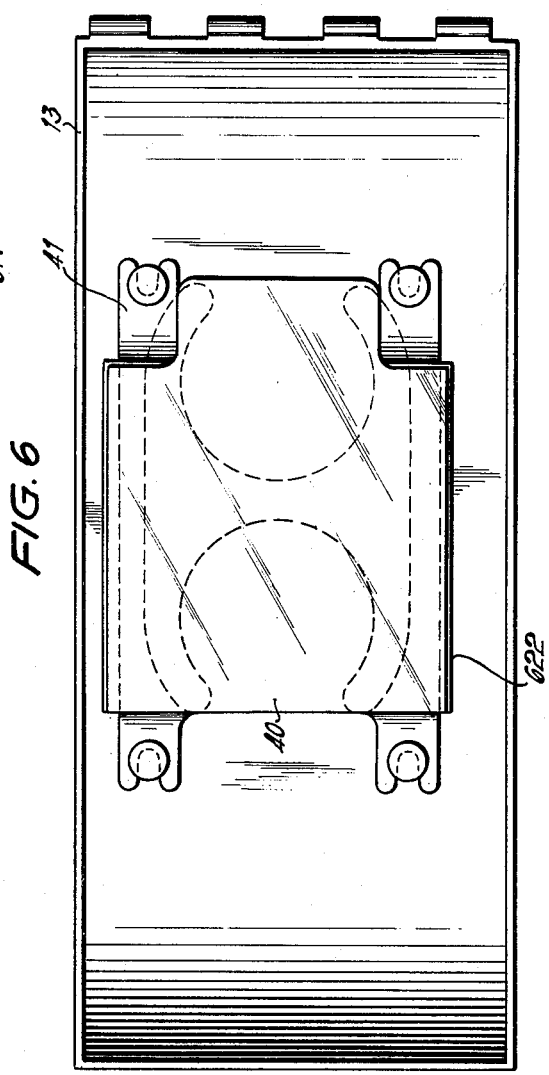

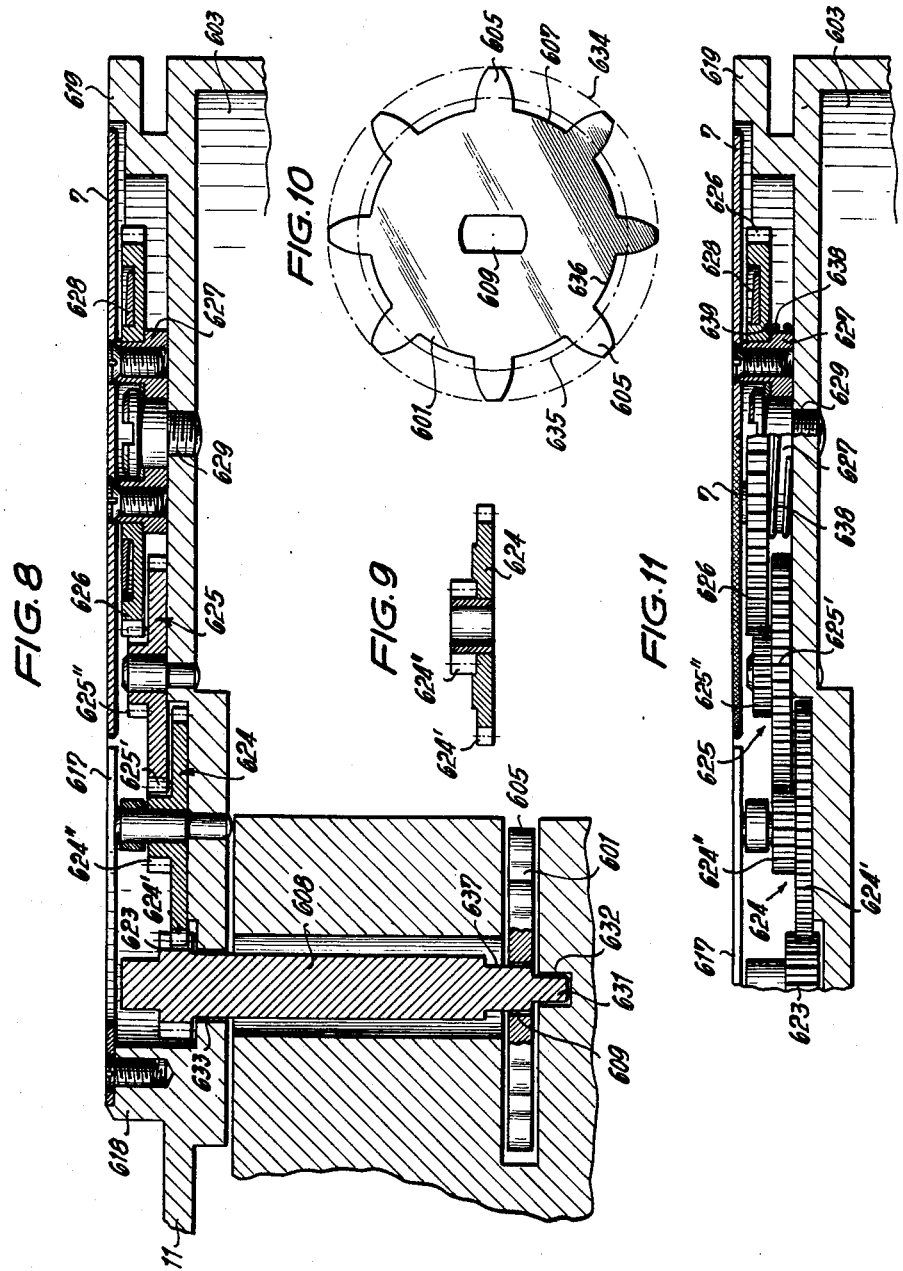

0
United States Patent Office 3,006,261
Patented Oct. 31, 1961

3,006,261
FILM COUNTER FOR MAGAZINE CAMERA
Wilhelm Kopp, Wiesbaden-Sonnenberg, Hermann Ploss, Frankfurt am Main, and Hans Hell, Wiesbaden-Freudenberg, Germany, assignors to Adox Kamerawerk G.m.b.H., Wiesbaden-Bieberich, Germany
Filed May 1, 1957, Ser. No. 656,348
Claims priority, application Germany May 2, 1956
6 Claims. (Cl. 95—34)

This invention relates to a roll film camera with an interchangeable magazine, especially to a counting mechanism system for the interchangeable magazine in which is disposed a film advance mechanism for the transport of the film, said film advance mechanism containing a transport roller engaging in the film perforation and a take-up spool connected to said transport roller through a toothed-wheel gear, and a device for indicating the film length or sequence of exposures.

According to the invention, the device for indicating the film length or exposure sequence and constituting a part of the counting mechanism is connected to a small wheel independent of the film advance mechanism and engaging in the film perforation and measuring the film length or exposure sequence. In contrast to the exposure counting mechanisms which are frequently used in roll film cameras and which are coupled to the film advance mechanism, the device according to the invention affords the advantage that it immediately indicates whether the film has been advanced by the correct amount. If for example the film tears for some reason, this can be detected at a glance from outside by means of the device according to the invention.

In a preferred embodiment of the invention, the small measuring wheel engaging in the film perforation is mounted in the mask frame of the interchangeable magazine. In addition to providing a dependable and simple mounting of the small measuring wheel and of the adjoining transmission parts, this means that the point at which the film strip is measured is situated in the immediate vicinity of the film aperture. The small measuring wheel is at the same time advantageously mounted above and beside the film aperture of the mask frame, on the side of the mask frame remote from the film advance mechanism. This gives the advantage that the measured part of the film strip is drawn in front of the film aperture immediately after it has been measured by the measuring wheel.

The device for indicating the film length or exposure sequence mounted on the interchangeable magazine may preferably be disposed at the top of the interchangeable magazine and be visible, when the interchangeable magazine is inserted in the camera, through an aperture situated in the top of the camera.

In a particularly simple and advantageous construction the device for indicating the film length or exposure sequence consists of a counter dial driven through a toothed-wheel gear by the measuring wheel directly measuring the film length. To simplify production and permit easy interchange, said toothed-wheel gear may contain two pairs of intermediate gear wheels having the same number of teeth.

To enable the device for indicating the film length or exposure sequence to be correctly set after the insertion of the film, the counter dial is rigidly but detachably connected to a ring on which is mounted a gear wheel driven through a toothed-wheel gear by the small measuring wheel engaging in the film perforation, the counter dial being driven by means of a friction spring and thus being adjustable relative to a zero mark in both directions of rotation.

The reduction ratio from the small measuring wheel to the counting mechanism dial is preferably 39:1. The circumference of the small measuring wheel may then be equal to the picture width. One revolution of the counter dial then corresponds to 39 pictures. Since the film usually used in the present camera can take 36 exposures, three blank points are obtained, which can be used for blank advances when the film is inserted.

For the purpose of mounting the reduction gear driving gear wheel, which is disposed on the same shaft as the small measuring wheel, in the housing of the interchangeable magazine on the one hand and in the mask frame on the other hand, the shaft of the driving gear wheel in the mask frame is mounted on a pivot only at the bottom while the mask frame above the bearing is bored out to such an extent that in this region the shaft has no contact with the mask frame. This type of mounting permits simple production because in the event of tolerance discrepancies of the housing of the interchangeable magazine and of the mask frame the shaft of the gear wheel has a certain equalising clearance without jamming occurring.

In a particularly advantageous embodiment of the invention, the entire counting mechanism with its reduction gear extends from the mask frame of the interchangeable magazine over the space for the film cassette and is so disposed that the entire gear is covered to the top by a cover plate in conjunction with the counter dial, the counter dial being mounted in a depression of the light-trapping torus, which is followed by a second torus. For convenient adjustment of the counter dial, said second torus is interrupted through approximately 90° at one part, preferably on the right front side wall of the film cassette chamber seen from above. The height of the entire counting mechanism at the same time advantageously nowhere projects beyond the height of the light-trapping torus.

In order to prevent the tension of the film being affected by subsequent adjustment of the counter disc after the insertion of the film, an unwinding lock may be disposed in addition to a friction spring between the counter disc and the reduction gear wheel carrying the latter. It is thereby achieved that the counter dial can only be adjusted against its direction of running when the interchangeable magazine is loaded with a film and the back wall is closed. This direction of rotation, which is the only one possible, corresponds to a direction of rotation of the small measuring wheel, which tensions the inserted film relative to the locked film transport mechanism.

In order to secure dependable engagement of the small measuring wheel in the perforation of the inserted film and hence dependable operation, the diameter of the addendum circle of the small measuring wheel is smaller than the ideal value of the diameter of the addendum circle of the small measuring wheel referred to the pitch of the film perforation, while the diameter of the dedendum circle of the measuring wheel is smaller than the ideal value of the already reduced dedendum circle diameter, and in the small measuring wheel is mounted in the mask frame in such manner that its teeth extend beyond the film support only from the height of the dedendum circle.

One embodiment of the invention will now be described, by way of example with reference to the accompanying drawings, in which:

FIGURE 1 shows a camera according to the invention seen from the rear in the open state with the interchangeable magazine inserted and likewise opened.

FIGURE 2 shows the interchangeable magazine opened with the film inserted, seen from the rear.

FIGURE 3 shows the interchangeable magazine with the film inserted in section on line III—III in FIGURE 2, with the rear wall closed.

FIGURE 4 shows the camera as seen from above.

FIGURE 5 shows the interchangeable magazine as seen from above.

FIGURE 6 shows the rear wall of the interchangeable magazine as seen from inside.

FIGURE 8 shows the counting mechanism gear in section on line VIII—VIII in FIGURE 7.

FIGURE 9 shows a pair of gearwheels of the gear.

FIGURE 10 shows the small measuring wheel in plan view.

FIGURE 11 shows the counting mechanism gear with an unwinding lock in partial section according to FIGURE 8.

Figure 7:
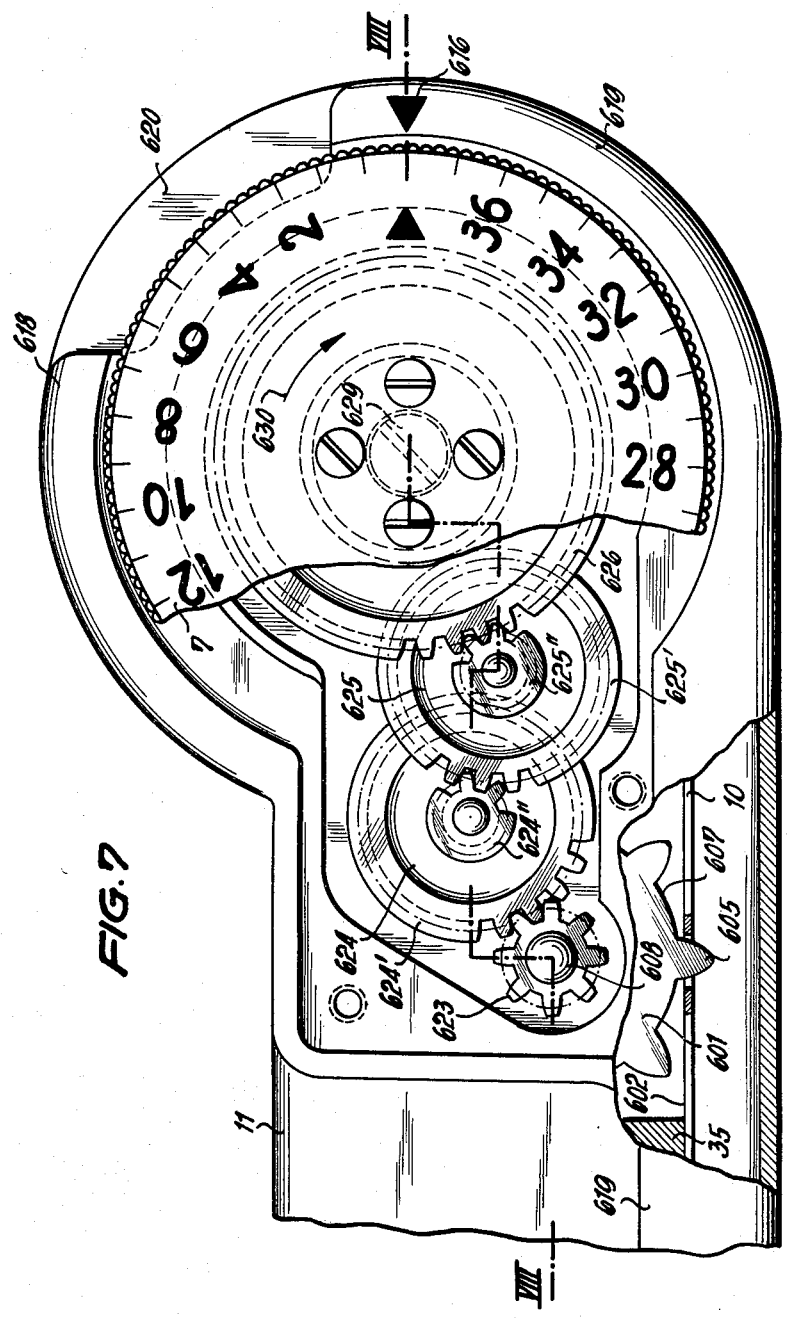
FIGURE 7 shows a part of the interchangeable magazine as seen from above, and partially broken away.

In the representation in FIGURE 1 with the camera 1 open at the rear and the interchangeable magazine 11, 13 inserted and open at the rear, will be seen the small measuring wheel 601 which engages with the film 10 when, as shown in FIGURE 2, the film 10 from the cassette 15 is placed over the mask frame 35 into the teeth of the film transport roller 16 and is fastened to the film take-up spool 17. The cover slide 114, which closes the film aperture 24 in the front wall 11 of the interchangeable magazine, is shown partially open in FIGURE 1. Said cover slide 114 is operated by the back wall locking key (not shown) through the coupling 460, 405 by means of the drum segment 401 rotatable about the shaft 18 of the film take-up spool 17. The film advance mechanism contains as an essential part the transport roller 16, which engages in the perforation of the film and is mounted on the shaft 63 and is operated by the camera shutter tensioning device through the gearwheel 225 and the coupling 57, 59. The film transport roller 16 is connected through the gearwheels 68 and 75 to the film take-up spool 17, so that the film take-up spool 17 is jointly driven by the film transport roller 16.

In the representation in FIGURE 1, the film advance mechanism is immediately followed on the right by the mask frame 35, which in addition to the film aperture 24, has a supporting surface constructed in the form of slideways 602 for the film 10. The small measuring wheel 601 is so mounted in the mask frame 35 in the embodiment illustrated that it projects into the top slideway 602 directly on the right beside the film aperture 24. In the representation of FIGURE 1, the space on the right beside the mask frame 35 is constructed as receiving chamber 603 for the film cassette 15.

The representation of FIGURE 2 corresponds essentially to that of FIGURE 1, but according to FIGURE 2 a film is inserted in the magazine. It will be seen how the small measuring wheel 601 engages in the perforation 604 of the film. The sectional view in FIGURE 3 shows even more clearly how the heads 605 of the teeth of the measuring wheel 601 pass through the perforation 604 of the film 10, while the bridges 606 between the perforation 604 do not reach the dedendum circle 607 of the small measuring wheel. The measuring wheel 601 is mounted on a shaft 608 and is secured against turning relatively to the shaft 608 by a profiled hole 609. In contrast to the small measuring wheel 601, the heads 610 of the teeth of the film transport rollers are constructed to be only flat and narrow. The film 10 at the same time bears on the dedendum circle 611 of the film transport roller 16.

As shown in FIGURE 4, the camera has in its top cap 220 an aperture 612 for the counter dial 7 of the interchangeable magazine 11, 13. In the embodiment illustrated, this aperture 612 is disposed on the right of the optical axis 480, while the exposure meter 613 with the control knob 614 and the rapid winding lever 615 of the shutter are disposed on the left thereof. The aperture 612 is so constructed that it simultaneously shows several numbers provided on the counter dial 7 and the indicating mark 616 provided on the interchangeable magazine.

The interchangeable magazine 11, 13 shown in FIGURE 5 carries in the right-hand part of its top part the counter dial 7 and a cover plate 617 for covering the gear parts of the counting mechanism. The counter dial 7 lies in a depression which is limited to the front by a protective torus 618, to the outside of the magazine wall by the light-trapping torus 619 and towards the centre of the magazine by the cover plate 617. This toric surrounding of the mounting is interrupted to the front right by a recess 620 to permit convenient adjustment of the counter dial 7.

FIGURE 5 also shows the decoupling pin 621, provided with the camera rewind knob, for the film transport roller 16.

As shown in FIGURE 6, the rear wall 13 of the interchangeable magazine 11 carries on its inside a film pressure plate 40 with a film pressure spring 41. In the present embodiment, the film pressure plate 40 is made from black glass so as not to damage the back of the film 10 and to prevent scratches. In respect of its shape, the film pressure plate 40 is recessed toward the measuring wheel 601 and mounted in a frame 622.

As will be seen from FIGURE 7, the gear by which the measuring wheel 601 is connected to the counter dial 7 extends from the mask frame 35 over the receiving chamber 603 for the film cassette 15. The gear contains the driving gearwheel 623, which is mounted on the shaft 608 of the measuring wheel 601, and also two identical pairs of gearwheels 624 and 625 and the carrier gearwheel 626 for the counter dial 7. The two pairs of gearwheels 624 and 625 are constructed in the same way and each consists of a gearwheel 624' and 625' respectively and a pinion 624" and 625" respectively.

The mode of operation of the device according to the invention is as follows:

The film advance mechanism comprising the film take-up spool 17 and the film transport roller 16 connected to the latter through the gearwheels 75 and 68 is driven according to FIGURE 4 by the advance and rapid wind lever 615 of the camera 1. The advance and rapid wind lever 615 is in geared connection with the gearwheel 225 and the coupling part 57. The film 10 is unwound from the film spool of the film cassette 15 on operation of the advance and rapid wind lever 615 (see FIGURE 4) and wound on to the film spool 17. During this, the film perforation 604, 606 drives the measuring wheel 601.

Since the gearwheel 225 is joined fast to the coupling half 57, the coupling half 59 is driven by the coupling half 57 and hence the shaft 63 of the film transport roller 16 is driven. The film transport roller 16 can be decoupled from the shaft 63.

The measuring wheel 601 has a profiled hole 609. The shaft 608 of the driving gearwheel 623 fits in said hole 609 by an appropriate pin. The driving gearwheel 623 is positively connected to the counter gearwheel 626 through the pairs of gearwheels 624 and 625. The counter gearwheel 626 is mounted on a ring 627. A counter dial 7 is joined fast to the ring 627. Between the counter dial 7 and the ring 627 the gearwheel 626 is adjustable relative to the indicating mark 616 by friction against the pressure of a spring or a spring ring 628. The ring 627 is rotatably mounted on the attached screw 629. The counter dial 7 is however advantageously adjusted in the direction of the embossed arrow 630, so as to eliminate gearwheel play. It is possible to dispose an unwinding lock between the ring 627 or the counter dial 7 and the gearwheel 626 in order to prevent unintentional turning of the counter dial 7 relative to the indicating mark 616 against the direction of the arrow 630. This device may be constructed in the form of a per se known locking spring, or a locking lever or the like. In order that zero adjustment of the counter dial 7 may be easily carried out in spite of the extremely compact construction of the interchangeable magazine 11, 13, the protective torus 618 for the counter dial 7 is interrupted at the front over an angle of about 90° at the point 620.

The entire counting mechanism is advantageously disposed above the chamber 603 to receive the film cassette 15. It is advantageously so constructed that, in spite of perfect operational dependability, it nowhere exceeds the height of the torus 619 containing the light-trap groove.

The reduction ratio from the gearwheel 623 to the gearwheel 626 is so selected that the transmission can be effected by means of two identical pairs of gearwheels 624 and 625 in spite of the small space available. By means of these identical pairs of gearwheels 624 and 625 it is achieved that the stocking and tool production of the gearwheel pairs 624 and 625 is simplified.

A particular simplification is also achieved according to the invention in respect of the arrangement for the mounting of the shaft 608 of the driving gearwheel 623. It will be seen from FIGURE 3 that the mask frame 35 and the casting 11 of the interchangeable magazine are two different parts which are made in the construction illustrated for structural reasons. It is difficult so to make these two castings 11 and 35 that bores made before the assembly for the shaft 608 of the gearwheel 623 lie in accurate register above one another. According to the invention, the shaft 608 of the gearwheel 623 is therefore mounted on the one hand in the casting 11 and on the other hand on a pivot 631 in the casting 35. A shift of the bearing points of the bearing bores 632 and 632 can thus occur to a certain degree without jamming occurring. The installation of this device is very simple. The mask frame 35 is inserted in the housing 11 of the interchangeable magazine and fastened in the latter. The measuring wheel 601 is inserted in the mask frame in accordance with FIGURES 1, 2, 3, 7 and 8 and the gearwheel 623 with its shaft 608 inserted according to FIGURE 3.

When the interchangeable magazine 11, 13 is loaded with a film 10 (with a film cassette 15), the film 10 is placed over the mask frame 35 into the teeth of the film transport roller 16 and fastened on the film take-up spool 17. The film perforation 604, 606 simultaneously comes into the engagement position relative to the measuring wheel 601. The back wall 13 of the interchangeable magazine is closed, and the film pressure plate 40 shown in FIGURE 6 presses the film 10 against the mask frame 35. During this, the perforation 604 of the film 10 comes to lie in the teeth of the measuring wheel 601. If engagement of the film perforation 604, 606 in the teeth of the counting mechanism measuring wheel 601 does not take place during this because a bridge 606 of the perforation has come to lie on the head of a tooth 605 of the measuring wheel 601, then engagement between the film perforation 604 and the counting mechanism measuring wheel 601 will take place automatically as a result of the special construction of the counting mechanism measuring wheel 601 during the necessary first blank advance of the film.

The counting mechanism measuring wheel 601 is therefore made as follows: The addendum circle 634 of the counting mechanism measuring wheel 601 would have to have a diameter of 14 mm. for example to correspond to the pitch of the film perforation. In that case engagement of the heads of the teeth 605 in the film perforation 604 would not take place until after unforeseen unwinding of the length of the film. The counting mechanism 7 would thus indicate inaccurately. According to the invention, however, the diameter of the addendum circle 634 of the counting mechanism measuring wheel 601 is reduced to 13 mm. with the above-assumed pitch of 14 mm. for the film perforation 604, 606. In addition, the tooth height is increased as described below. As will be seen from FIGURE 3, the outside diameter of the film transport roller 16 is larger than the outside diameter of the counting mechanism measuring wheel 601.

Since in the present embodiment the mask frame 35 is made independently of the housing 11 of the interchangeable magazine, for the purposes of the operational dependability required the dedendum circle 636 of the counting mechanism measuring wheel 601 does not have a diameter of 11 mm., such as corresponds to the addendum circle 634, but a diameter of only 9 mm. It is thus prevented that, in the event of divergence of the bearing point 632 from the ideal in the direction towards the film support 602, the counting mechanism measuring wheel 601 with an ideal diameter of 11 mm. for the dedendum circle 635 is able to lift the film 10 from the film support 602. This would result in unsharp exposures. Thus if the dedendum circle 636 of the counter mechanism measuring wheel 601 lies lower and thus the tooth height is 1 mm. greater than in the case of a conventional wheel (compare the film transport roller 16) engaging in the film perforation and having an addendum circle ideal diameter of 14 mm., the divergence of the bearing point 632 from the ideal value would have to be equally as much until the film were lifted up. Since however there is no danger of such a divergence from the ideal value, the advantage of the above described form of construction of the counting mechanism measuring wheel 601 mounted in the mask frame 35 consists mainly in that it guarantees complete operational dependability. The counting mechanism measuring wheel 601 is driven by the film 10. In consequence, the next tooth 605 engages in the perforation of the film 10 earlier than in the former construction of perforation-engaging wheels. During the film advance, the counter measuring wheel 601 then slips by the pitch difference relative to the film 10, but this is insignificant. The engagement of the teeth is, as described above, considerably more dependable than when the pitch 604, 606 corresponds exactly to the tooth heads 605, as soon as the film 10 drives the counter measuring wheel 601.

According to FIGURE 11, the unwinding lock consists of the coil spring 638, which lies firmly on the ring 627 and which engages in the gearwheel 626 by a projection 639. On rotation of the counter dial 7 relative to the gearwheel 626 in the direction of the arrow 630, the spring 638 loosens, which in the reverse direction of rotation it tightens and prevents the counter dial 7 from turning relative to the gearwheel 626.

We claim:

1. In a camera, in combination, a magazine having a top wall; a gear turnably supported in said magazine for cooperation with film perforations to be turned solely by movement of the film during operation of the camera, said gear being completely independent of film advancing mechanism of the camera; an indicator disc turnably carried by said magazine on said top wall thereof and at the exterior thereof for indicating the number of exposures which have been made; a shaft connected with said gear to be turned thereby and extending from said gear upwardly through the top wall of said magazine; a gear train located on said top wall and operatively connected with said shaft and disc for transmitting rotation of said shaft to said disc, said top wall being formed at its exterior with a recess defined at least in part by a light-trapping lip and the top end portion of said shaft, said gear train and said disc being located in said recess, said lip having an elevation at least as high as the uppermost parts of said shaft, gear train and disc so that said shaft, gear train and disc do not protrude above said lip; and a camera housing into which the magazine is placed for exposure of the film therein, said camera housing having a top wall formed with an opening through which at least part of said disc is visible.

2. In a camera as recited in claim 1, a cover plate carried by said top wall of said magazine and located beside said disc, said disc and cover plate cooperating together for covering the entire gear train and said lip having an elevation at least as high as said cover plate.

3. In a camera as recited in claim 1, said lip being formed with a cutout through which said disc is accessible at an edge thereof for adjustment.

4. In a camera, in combination, a magazine having a top wall; a shaft extending downwardly through said top wall into the interior of said magazine; a masking frame located in said magazine for guiding film during its movement and for defining the limits of the exposed film frames, said masking frame being formed with an elongated bore through which said shaft extends with substantial clearance and said masking frame supporting said shaft only at its bottom end portion for rotation; a single gear connected to said shaft in the interior of said magazine for turning said shaft when said gear turns, said gear cooperating with film perforations to be turned only by movement of the film and being completely independent of film advancing mechanism of the camera; an indicator disc turnably located on said magazine top wall at the exterior thereof for indicating the number of exposures; and transmission means located exclusively on said top wall at the exterior thereof and cooperating with said shaft and disc for transmitting rotation of said shaft to said disc for turning the latter in response to film movement; and a camera housing for receiving said magazine, said housing having a top wall formed with an opening through which at least part of said disc is visible.

5. In a camera, in combination, a magazine having a top wall; a first gear turnably supported in said magazine for cooperation with film perforations to be turned solely by movement of the film during operation of the camera, said first gear being completely independent of film advancing mechanism of the camera; an indicator disc for indicating the number of exposures; support means carrying said disc and supported for free turning movement on said top wall of said magazine; a second gear supported for free turning movement by said support means, said second gear being coaxial with and located adjacent said disc; a friction spring located between and engaging said disc and second gear for transmitting turning of the latter to said disc while freeing the latter for adjustment independently of said second gear; transmission means carried in its entirety by said magazine and cooperating with said first and second gears for turning said second gear in response to turning of said first gear, so that the entire film counting mechanism is carried by the magazine; and a camera housing into which the magazine is placed for exposure of the film therein, said camera housing having a top wall formed with an opening through which at least part of said disc is visible.

6. In a camera as recited in claim 5, one-way transmission means cooperating with said second gear and support means for transmitting rotation of said second gear in only one direction to said support means.

References Cited in the file of this patent

UNITED STATES PATENTS

| | | |
|---|---|---|
| 2,147,106 | Nuchterlin | Feb. 14, 1939 |
| 2,257,424 | Meyer | Sept. 30, 1941 |
| 2,266,426 | Koszalka et al. | Dec. 16, 1941 |
| 2,469,008 | Simmon et al. | May 3, 1949 |
| 2,521,933 | Mihalyi | Sept. 12, 1950 |
| 2,530,510 | Crumrine | Nov. 21, 1950 |
| 2,553,656 | Kirby | May 22, 1951 |

FOREIGN PATENTS

| | | |
|---|---|---|
| 834,548 | France | Oct. 22, 1938 |
| 224,438 | Switzerland | Oct. 23, 1941 |
| 65,285 | France | Oct. 5, 1955 |